July 30, 1940.   J. E. CURTIS   2,209,561
CEMENT COOLER
Filed Aug. 17, 1938   2 Sheets-Sheet 1
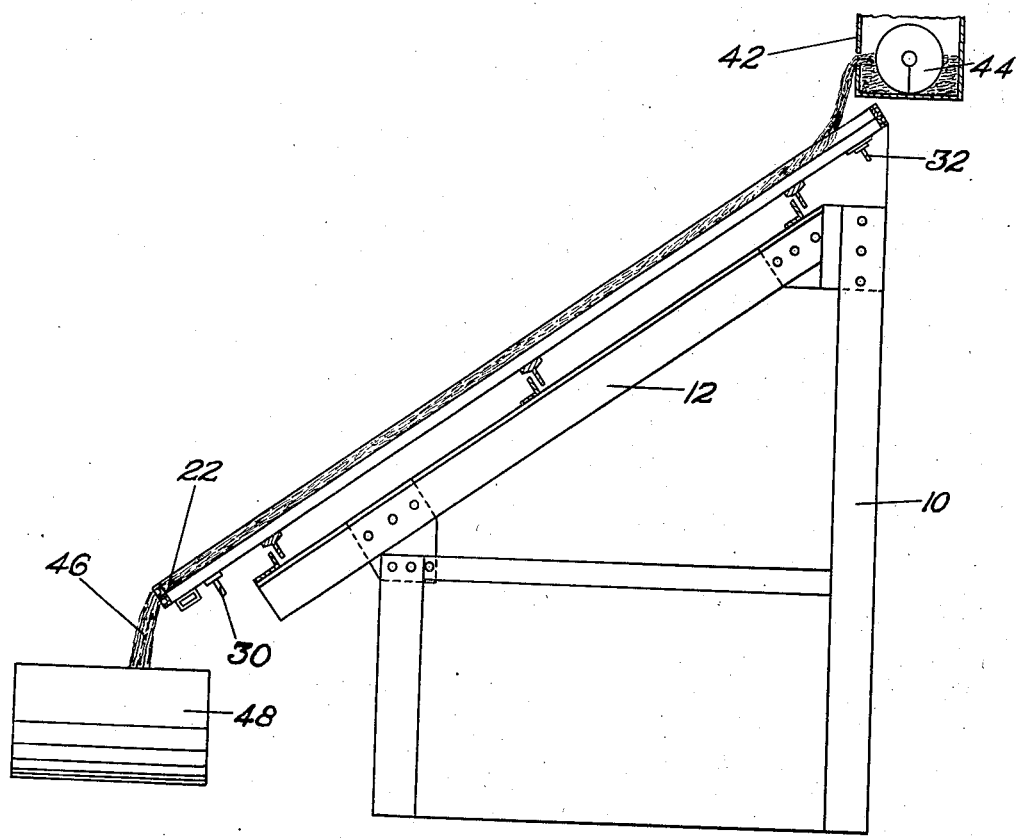
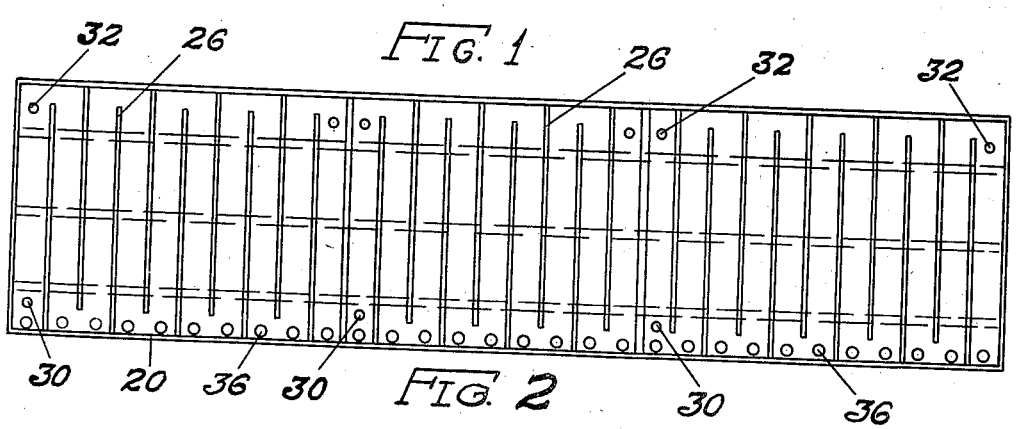
JAMES E. CURTIS
INVENTOR
PER
ATTORNEY July 30, 1940.  J. E. CURTIS  2,209,561
CEMENT COOLER
Filed Aug. 17, 1938  2 Sheets-Sheet 2
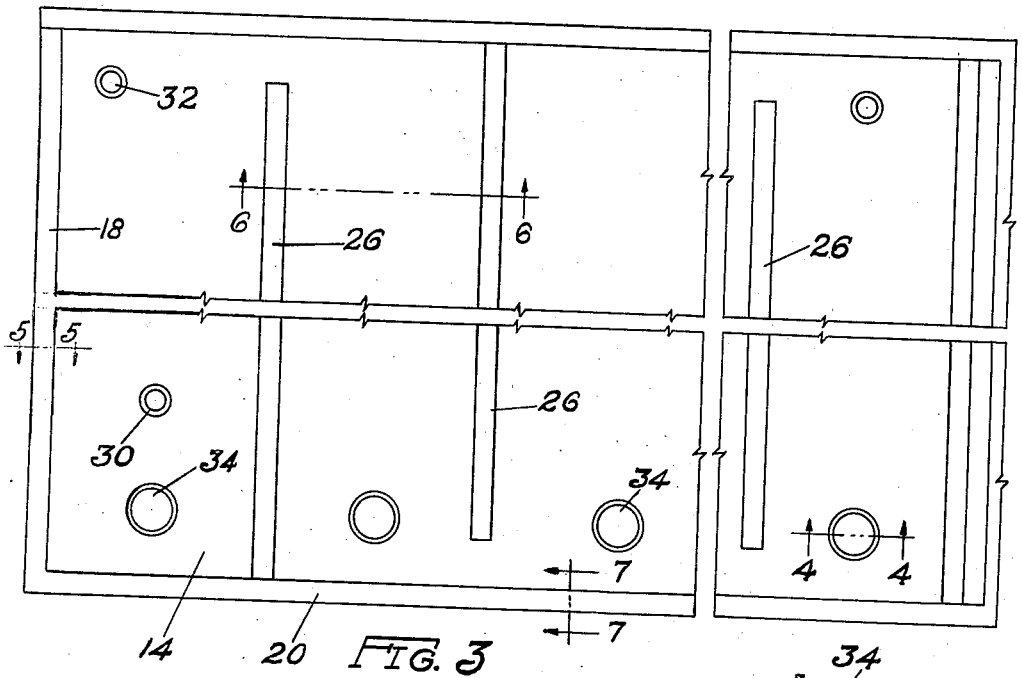
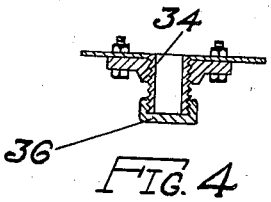
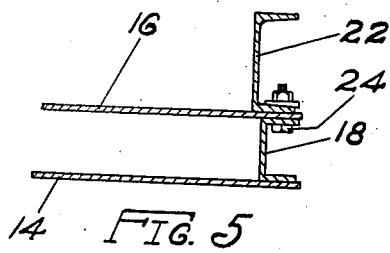
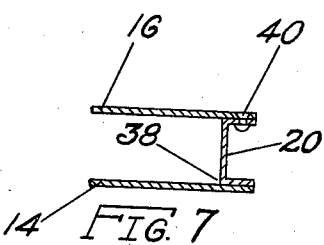
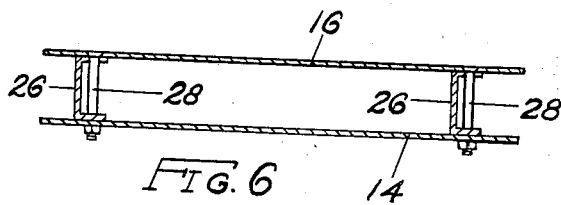
JAMES E. CURTIS
INVENTOR
PER
ATTORNEY Patented July 30, 1940

2,209,561

UNITED STATES PATENT OFFICE 2,209,561

CEMENT COOLER

James E. Curtis, Jackson, Mich., assignor to Cowham Engineering Co., Chicago, Ill., a corporation of Delaware Application August 17, 1938, Serial No. 225,328

2 Claims. (Cl. 257—179)

This invention relates to an improved cement cooler, and has, for one of its principal objects, the provision of a device for cooling cement such as Portland cement or the like immediately after it comes from the grinding process and prior to its being conveyed to storage, or at any other time or place.

One of the principal objects of this invention is to provide a cooling apparatus which can be readily installed in cement mills and which can be operated in conjunction with the usual processes without any undue additional expense and which, at the same time, will adequately bring down the temperature of the cement from undesirable ranges.

Another and still further important object of the invention is to provide a cement cooling equipment which is so constructed that it can be used in single or joined units whereby the same can be readily adapted to the capacity of any particular mill and wherein a very efficient heat transfer is effected without loss of time and with practically no additional labor cost.

Other and further important objects of the invention will be apparent from the disclosures in the accompanying drawings and following specification.

The invention, in a preferred form, is shown in the drawings and hereinafter more fully described.

In the drawings:

Figure 1 is a side elevation of the improved cement cooling device of this invention, showing the same in operation.

Figure 2 is a front view of the apparatus with the cover plate removed, thereby showing the interior construction.

Figure 3 is an enlarged detail view of a representative section of the apparatus.

Figure 4 is a section on the line 4—4 of Figure 3, showing one of the drain plugs.

Figure 5 is a section on the line 5—5 of Figure 3, including a showing of the side or supporting rail.

Figure 6 is a section on the line 6—6 of Figure 3.

Figure 7 is a section on the line 7—7 of Figure 3.

As shown in the drawings:

The reference numeral 10 indicates generally the framework or supporting structure for the improved cement cooler of this invention, the same comprising a series of uprights and cross braces together with an angular supporting beam 12, and it is upon this angular supporting beam that the cooler proper is supported.

As heretofore explained, the cooler is in sections, two or more of which may be joined together into a unitary structure, and each section or cooling element comprises essentially a lower plate 14, preferably of sheet steel or the like, and an upper plate 16, preferably of sheet copper or some other metal which has a rather high heat conductivity.

Each section is outlined by side and end elements 18 and 20 respectively as best illustrated in Figure 3, these elements being preferably in the form of channel irons which, in addition to providing proper support for the sheet metal elements, also act as closures for the retention of a cooling fluid such as water.

Each section is surmounted by an additional channel structure at its sides as illustrated at 22 in Figure 5 which functions first as a guard to prevent spilling of the cement being cooled and also comprises an actual support for the sheet metal, acting in conjunction with the lower channel structure 18 to which it is connected by means of the bolts 24.

Each section is further provided on its interior and between the layers of steel and copper 14 and 16 respectively with baffles as best shown at 26 in Figures 3 and 6, which baffles are preferably in the form of channel irons as shown held in position by means of bolts or the like 28. As illustrated in Figures 2 and 3, certain of the baffles extend from the lower edge of the cooling element to a point closely adjacent its upper edge, and other baffles extend from the upper edge to a point closely adjacent the lower edge so as to provide a desired circulation of cooling water in the usual manner.

The cooling water or other liquid is introduced through inlets 30 as indicated in Figures 2 and 3 and escapes through outlets 32, the inlets being adjacent the lower edge and the outlets adjacent the upper edge of each cooling section. The cooler section is thus always full of liquid, and while some liquid may pass directly from one inlet 30 to the adjacent outlet 32 directly above the same, there is also considerable circulation of the fluid within the walls of the chamber due to convection whereby circulation and suitable cooling action takes place over the entire surface of the plate 16. Obviously, the control of water or other cooling fluid through the inlets and outlets may be arranged to meet the requirements of any particular situation by the usual valves or the like. Additionally, the drain openings and plugs 34—36 are provided as shown in Figures 2, 3 and 4, these drain openings being preferably at the lower edge of the device.

As best shown in Figure 7, the channel element 20, which joins the lower edges of the steel and copper sheets 14 and 16 respectively, can be fastened to the steel by means of welding or the like 38, and is preferably fastened to the copper by means of countersunk rivets 40. This countersinking of the rivets in the surface of the copper eliminates projections which might interfere with the smooth flow of the ground cement over the cooler, and obviously, this same construction can be used in order to eliminate the projecting heads of the bolts 28 shown in Figure 6.

In operation, the freshly ground cement which is usually at quite a high temperature, namely around 350° F., is spilled into the cooler from a receptacle 42 having a screw conveyer 44 or some similar device therein. The material is fed into the upper part of the cooling table, and the screw conveyer assures that it is uniformly distributed across the entire width of the apparatus, and the cement flows thereover in a sheet of uniform depth, the water or other cooling fluid being, of course, at the same time circulated through the interior of the cooler in and around the baffles 26.

The cooled cement 46 is then allowed to drop into a longitudinally extending conveyer or the like 48 from whence it is delivered to storage.

It will be evident that herein is provided a cooling device for ground cement which eliminates the objectionable high temperatures to which the cement is heated in the grinding process and also eliminates the objectionable retaining of this heat during the storage of the cement, it having been found that this heat is retained for periods of considerable length, even as long as one year. Oftentimes, when the cement is withdrawn for shipment, even after a considerable time has elapsed since grinding, it still retains a great amount of this undesirable heat which is extremely objectionable for certain work and under certain circumstances.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A cement cooler, comprising an inclined surface composed of metal having a high heat conductivity, the inclined surface forming one wall of the container for a cooling fluid together with a sheet of a metal of a lower heat conductivity below and spaced from the first-named sheet, walls for joining the sheets into a fluid-tight compartment, baffle plates between the sheets, said baffle plates comprising channel irons supporting and spacing the sheets, the baffle plates being alternately foreshortened at the upper and lower ends to provide passages, together with inlet and outlet openings in the lower sheet, the inlet openings being at the lower end and the outlet openings at the upper end of the inclined cooler, and causing a continually reversing convection flow below the surface of the inclined cooler between the inlet and outlet.

2. A cement cooler, comprising a plurality of inclined surfaces, each composed of metal having a high heat conductivity, the inclined surface forming one wall of a container for a cooling fluid together with a sheet of a metal of a lower heat conductivity below and spaced from the first-named sheet, wall means for joining the sheets into a fluid-tight compartment, baffle plates between the sheets, said baffle plates comprising channel irons supporting and spacing the sheets, the baffle plates being alternately foreshortened at the upper and lower ends to provide passages, inlet and outlet openings in the lower sheet, an additional series of drain openings at the lower edge of the under sheet, together with means for joining several of the cooling devices into a single unit, combined upper support and guard rail at the lateral edges of each of the plate sections and bolts joining the rails and walls to each other and to the edges of the plate section.

JAMES E. CURTIS.